Patented Jan. 9, 1945

2,366,850

UNITED STATES PATENT OFFICE 2,366,850

FLAKE ALUMINUM FINISHES FOR LINING FOOD CONTAINERS

Morris G. Gardner, Orange, N. J., assignor to Pittsburgh Plate Glass Company, Allegheny County, Pa., a corporation of Pennsylvania No Drawing. Application November 22, 1940, Serial No. 366,555

3 Claims. (Cl. 99—181)

The present invention relates to coating compositions containing as a pigmentary body metallic aluminum in flake form, and it has particular relation to the provision of such compositions for use as a liner for food wrappings or containers.

Tin cans and such like containers, for comestible products, such as fruits, vegetables, fish, fruit juices, beer and other beverages and the like, have long been manufactured from thin sheet iron or steel having coatings of tin upon the surface thereof, in order to render it corrosion resistant. Tin of course is relatively expensive to obtain and moreover the country is largely dependent upon foreign sources for its supply. The coatings obtained by its use are more or less subject to corrosion by food acids and usually contain many minute pin-holes through which acids normally present in food products can attack the metal beneath the coating and within a relatively short time induce failure. In an effort to obviate the defects of conventional tin plate as a material for the fabrication of food containers various varnish or lacquer coatings for the tinned surfaces have been developed. These usually include an organic plastic dissolved in a suitable volatile solvent.

However, the conventional varnish coatings have not been entirely satisfactory. Obviously the requirements placed upon such coating are very exacting. The coating must possess good adhesion to the metal surface to be protected; it must be of low permeability to liquids; it must be capable of withstanding chemical action of the food products stored in the containers; it must be sufficiently flexible and resistant to hardening by cold to withstand flexing and changes of temperature without flaking or cracking; and it must be tough and hard enough to withstand scurring and wear. Likewise it must be completely non-toxic and must be able to withstand the heat required in sterilizing containers and the food products which are added thereto.

It has heretofore been recognized that pulverulent aluminum, notably in flake form, has the capacity of improving the characteristics of many coating compositions for certain purposes. For example, it is found that the aluminum enhances the resistance of the film to permeation by moisture. It also enhances the adhesion of the film to metallic surfaces. Furthermore, it improves the resistance of the film to chemical action, such as occurs from contact with food products during storage and also during periods of sterilization. Accordingly, it has gone into extensive use in the coatings for the exteriors of cans. However, it has heretofore been impossible to employ for food containers aluminum containing lining compositions which have direct contact with foods because of the tendency during the processing and storage of the foods for the small particles of aluminum to "crock" or leave the surface of the film and enter the food. This obviously could not be tolerated in a commercial product.

The present invention involves the discovery that this crocking of the aluminum particles into the contents of food packages was apparently due to the presence of certain fatty or waxy bodies commonly employed as coatings for the aluminum particles during the process of preparing the pastes or powders. By using flake aluminum free of the coatings as a constituent, it is possible to obtain compositions suitable for use as a liner for food containers and which does not "crock off" into the contents of the container during storage.

Certain new techniques of grinding now admit of preparation of flake aluminum completely free of any coatings of fatty or wax-like substances. It also of course is possible to wash flake aluminum containing coatings of such substances with a volatile solvent, thus removing the objectionable material and leaving flakes of aluminum essentially free of objectional coatings. This form of aluminum is suitable for use in the practice of the invention.

When this special flake aluminum is incorporated into film-forming compositions in appropriate amount, based upon the solids content of the coating composition, a product is obtained eminently suitable for coating the interior of various food containers including tin cans employed in the preservation of such food products as fruits, vegetables, juices, fish, meats, beer and the like. It has been found that the ratio by weight of special flake aluminum to the solid portion of the film-forming composition can vary in wide proportions depending on the type of resins, oils, plasticizers and solvents used and also the type of application used in applying the coating.

The flake aluminum may be added to substantially any of the common vehicles, which may be employed in the coating of food containers. These include oleo-resinous varnish containing volatile solvents, varnishes containing drying, semi-drying or non-drying oils, and solutions of resins or resin esters, such as fossil or other natural and ester resins. Phenol-formaldehyde resin; alkyd resins; urea-formaldehyde resin; various vinyl resins including the copolymer of vinyl acetate and vinyl chloride termed Vinylite H and including for example 60 to 90% vinyl chloride, the rest being vinyl acetate; include also resins of the polymerized esters of acrylic acid type, known in trade as acryloids and methacrylates; chlorinated rubber and the like. The solvent will be employed in an amount sufficient to give desired consistency to the composition. The following are examples of compositions that may be employed:

EXAMPLE I

*Oleoresinous aluminum coating for roll coat application*

The following ingredients:

| | | |
|---|---|---|
| "Run" Congo resin | lbs | 100 |
| China-wood oil | gals | 15 |
| Bodied linseed oil | gals | 3 |
| Manganese acetate | ozs | 5 |
| Mineral spirits | gals | 40 | are made into a varnish by the usual conventional methods.

87 lbs. of above varnish is incorporated with 13 lbs. of special flake aluminum powder or the equivalent in paste form. This latter mix is ready for application to the flat metallic plate by means of a roll coating machine. The viscosity of this mix should be about one centipoise. After application to the flat plate the aluminum coating is baked in an oven for about 15 minutes at 400° F.

*Example I (A).*—By reducing the above aluminum coating mixture with coal tar solvents or mineral spirits to 0.5 centipoise, application to the metallic plate or formed container can be done by means of a spray gun.

EXAMPLE II

*Phenol-formaldehyde aluminum coating for spray application*

6 lbs. of special flake aluminum powder is added to 94 lbs. of a solution containing—

| | Per cent by weight |
|---|---|
| A 100% phenol-formaldehyde alcohol soluble resin. This resin is also known as a heat reactive alcohol soluble phenol-formaldehyde type | 24 |
| Octyl alcohol | 15 |
| Butyl alcohol | 20 |
| Methyl iso-butyl keton | 20 |
| Xylene | 15 |

This composition gives a coating of approximately .5 centipoise and is applied by spray application to the interior of the metal container and baked for approximately 15 minutes at 350° Fahrenheit.

EXAMPLE III

*Vinylite aluminum coating*

Formula composition:

| | Pounds |
|---|---|
| Special flake aluminum powder | 4½ |
| Vinylite "H" resin | 14½ |
| Methyl normal amyl ketone | 65½ |
| Methyl iso-butyl ketone | 20 |
| Total | 104½ |

Above gives a composition which can be sprayed on to the interior of the formed container or roll coated on the flat steel or tin plate. After application the coating is baked for 15 minutes at 300° F.

Methods of application of the compositions may be conventional and include spreading, dipping, roll-coating, brushing, spraying, with a doctor blade or any other convenient method.

Application may be to sheet metal, which is then formed into containers, or the formed containers may be lined by spraying or dipping. The metal may be "black iron," or may be previously coated with a thin film of tin. The surface of the metal may, also, receive a preliminary phosphatization such as so-called bonderization, in order to improve adhesion. This is particularly effective in the coating of so-called black iron with chlorine containing plastics, such as the copolymer of vinyl chloride and vinyl acetate. The coatings may be hardened by air drying, or by baking as in conventional practice.

The containers are to be coated within with the improved compositions constituting the subject matter of the present invention. The exteriors of the containers may be coated with the same material or any other desired material.

The following constitutes some of the improvements from the use of the compositions constituting the subject matter of the present invention:

1. Improved adhesion to metallic surfaces.
2. Complete absence of scuffing or marring of the coating through handling of the coated plate prior to and during can manufacture.
3. Absence of smearing or adherence of aluminum particles through contact with other plates during handling and storing.
4. Improved elasticity, adhesion and surface hardness, which enables the coating to withstand the usual drawing and stamping operations.
5. Absence of any tendency of the aluminum in the coating composition to enter and contaminate the food products within the containers.
6. Improved resistance of a coating to the attack of food products during sterilization at high temperatures and during shortage of the food in the can.

The use of wax and fat free aluminum powder for tin cans and the like metallic containers has been particularly described. However, the use of the powder in linings for paper and similar containers used in the packaging of food products is contemplated.

The forms of the invention herein described are to be considered merely as exemplary. It will be apparent to those skilled in the art that numerous modifications may be made therein without departure from the spirit of the invention or the scope of the appended claims.

What I claim is:

1. A food package comprising a tin coated ferrous metal container and a food product in the container, said container being lined with a non-crocking coating of plastic containing flake aluminum as a pigment, this flake aluminum being free of fatty and waxy coatings.

2. A food package comprising a tin coated ferrous metal container and a food product in the container, said container being lined with a non-crocking coating of a copolymer of vinyl acetate and vinyl chloride, the plastic containing as a pigment flake aluminum which is free of fatty and waxy coatings.

3. A method of lining food containers which method comprises applying to the surfaces to be lined a film of plastic containing distributed therein a powdered aluminum which is free of greases and waxes, the lining being non-crocking.

MORRIS G. GARDNER.